US012750612B2

(12) United States Patent
Matsuyama et al.

(10) Patent No.: US 12,750,612 B2

(45) Date of Patent: Sep. 29, 2026

(54) SPEAKER

(71) Applicant: JVCKENWOOD Corporation, Yokohama (JP)

(72) Inventors: Marin Matsuyama, Yokohama (JP); Akihide Shigihara, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 114 days.

(21) Appl. No.: 18/983,428

(22) Filed: Dec. 17, 2024

(65) Prior Publication Data

US 2025/0119671 A1    Apr. 10, 2025

Related U.S. Application Data

(63) Continuation of application No. PCT/JP2023/022388, filed on Jun. 16, 2023.

(30) Foreign Application Priority Data

Jul. 8, 2022 (JP) ................................ 2022-110152

(51) Int. Cl.
*H04R 1/02* (2006.01)

(52) U.S. Cl.
CPC ............. *H04R 1/023* (2013.01); *H04R 1/025* (2013.01)

(58) Field of Classification Search
CPC ................................ H04R 1/023; H04R 1/025
USPC .......................................................... 381/391
See application file for complete search history.

(56) References Cited

U.S. PATENT DOCUMENTS

| | | | | |
|---|---|---|---|---|
| 2015/0319521 A1* | 11/2015 | Yuen | H04R 1/1075 381/380 |
| 2022/0070576 A1* | 3/2022 | Della Rosa | H04R 1/021 |

FOREIGN PATENT DOCUMENTS

| | | | |
|---|---|---|---|
| JP | 51-143436 | | 11/1976 |
| JP | 56-105986 | | 8/1981 |
| JP | 11-285088 | | 10/1999 |
| JP | 2000014599 | | 1/2000 |
| JP | 2000-244992 | | 9/2000 |
| JP | 2003078979 A | * | 3/2003 |
| JP | 2007081789 A | * | 3/2007 |

OTHER PUBLICATIONS

International Search Report and Written Opinion for International Application Serial No. PCT/JP2023/022388 mailed Sep. 5, 2023, 9 pages.

* cited by examiner

*Primary Examiner* — Sean H Nguyen

(74) *Attorney, Agent, or Firm* — Amin, Turocy & Watson, LLP

(57) ABSTRACT

A speaker includes a cabinet that includes a cover portion in which a sound hole is arranged, a speaker unit that is housed in the cabinet, a sealing portion that is arranged so as to surround the sound hole and seals a gap between the cover portion and the speaker unit, and slit portion that is arranged from an inner peripheral portion to an outer peripheral portion of the sealing portion such that an inner side and an outer side surrounded by the sealing portion communicate with each other.

5 Claims, 6 Drawing Sheets

SPEAKER

CROSS-REFERENCE TO RELATED APPLICATIONS

This application is a Continuation of PCT International Application No. PCT/JP2023/022388 filed on Jun. 16, 2023 which claims the benefit of priority from Japanese Patent Application No. 2022-110152 filed on Jul. 8, 2022, the entire contents of both of which are incorporated herein by reference.

BACKGROUND OF THE INVENTION

1. Field of the Invention

The present disclosure relates to a speaker.

2. Description of the Related Art

A speaker that is arranged on a ceiling portion is known (for example, see Japanese Unexamined Patent Application Publication No. 2000-244992). When the speaker as described above is installed in a certain place, such as an outdoor pool, an indoor pool, a bathroom, or a shower room, where the speaker is likely to be splashed with water, a structure for draining internal water is arranged in the speaker to prevent accumulation of water inside the speaker.

As a drainage structure as described above, a configuration of arranging a drain hole in an exterior portion of the speaker has been proposed. This configuration is not preferable in terms of design because the drain hole is black, stands out, and reduces attractiveness of appearance.

SUMMARY OF THE INVENTION

It is an object of the present invention to at least partially solve the problems in the conventional technology.

The above and other objects, features, advantages and technical and industrial significance of this invention will be better understood by reading the following detailed description of presently preferred embodiments of the invention, when considered in connection with the accompanying drawings.

A speaker according to the present disclosure comprising: a cabinet that includes a cover portion in which a sound hole is arranged; a speaker unit that is housed in the cabinet; a sealing portion that is arranged so as to surround the sound hole and seals a gap between the cover portion and the speaker unit; and a slit portion that is arranged from an inner peripheral portion to an outer peripheral portion of the sealing portion such that an inner side and an outer side surrounded by the sealing portion communicate with each other.

DETAILED DESCRIPTION OF THE PREFERRED EMBODIMENTS

Embodiments of a speaker according to the present disclosure will be described below based on the drawings. The present invention is not limited by the embodiments below. In addition, components in the embodiments described below include one that can easily be replaced by a person skilled in the art and one that is practically identical.

First Embodiment

Figure 1:
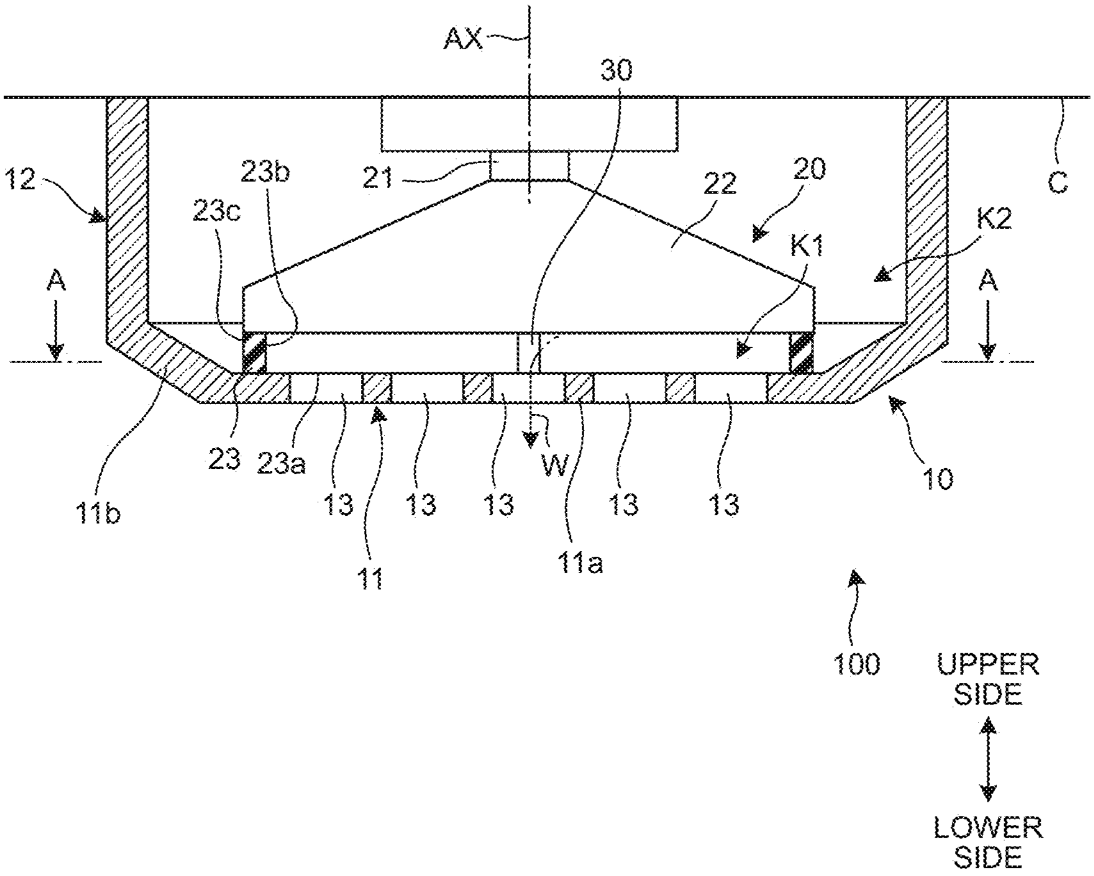
FIG. 1 is a diagram illustrating an example of a speaker according to a first embodiment.

FIG. 1 is a diagram illustrating an example of a speaker 100 according to a first embodiment. FIG. 1 illustrates a cross section of a part of components (a cabinet 10, a gasket 23, and slit portions 30). As illustrated in FIG. 1, the speaker 100 is installed in a ceiling portion C and emits sound downward. The speaker 100 may be arranged under eaves in an outdoor facility, such as a multi-storey parking facility or a shopping mall, or may be arranged in a ceiling portion in an indoor facility, such as a bathroom, a shower room, a kitchen, or a pool.

Figure 2:
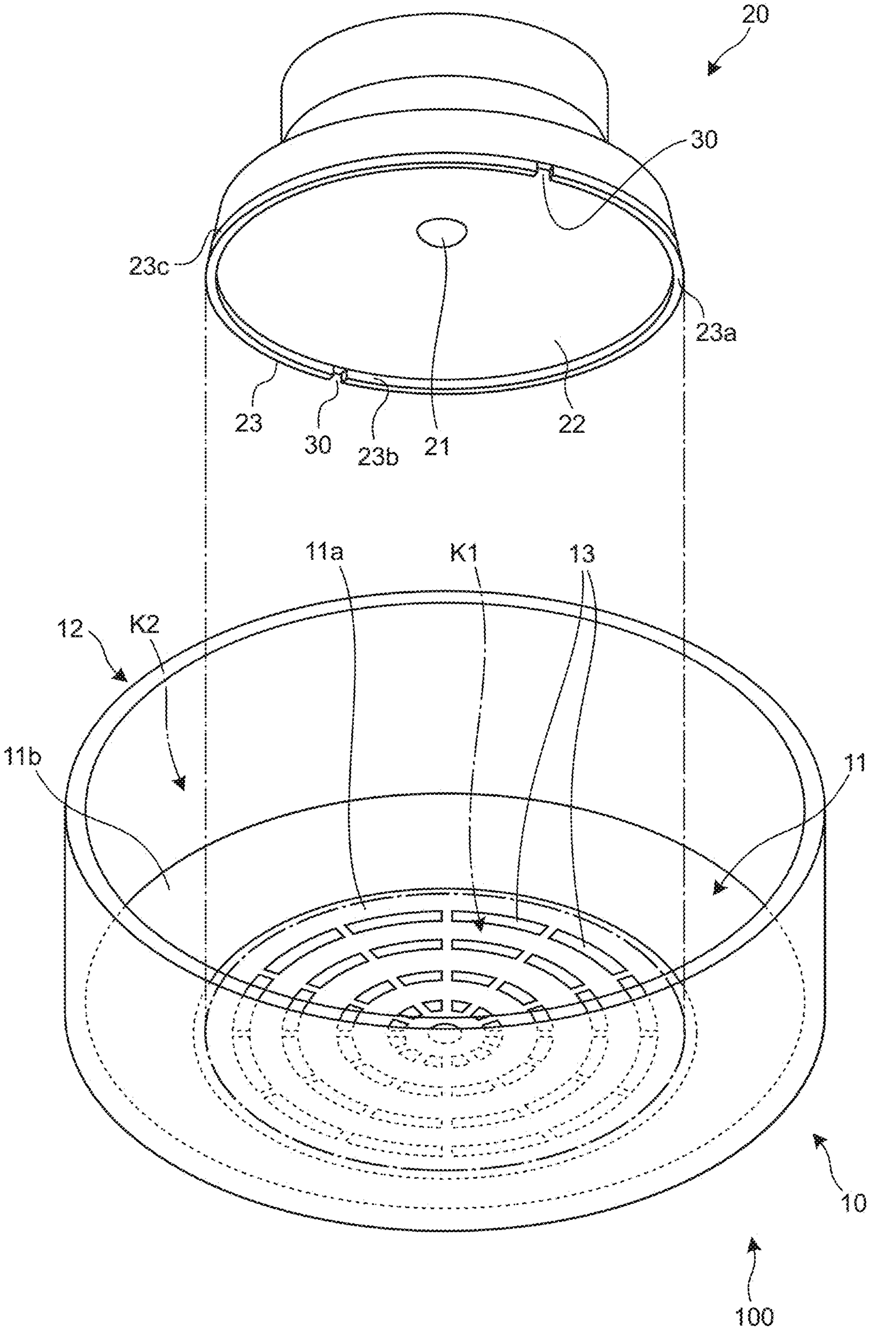
FIG. 2 is an exploded perspective view illustrating an example of the speaker according to the first embodiment.

The speaker 100 includes the cabinet 10 and a speaker unit 20. The speaker 100 is detachably attachable to a base cabinet (not illustrated) or a base metal fitting that is attached to a ceiling or the like in advance. Meanwhile, it is possible to arrange an electrical component of the speaker 100 on the base cabinet. By arranging the electrical component of the speaker 100 on the base cabinet, it is possible to reduce a risk that the electrical component is submerged in water. FIG. 2 is an exploded perspective view illustrating an example of the speaker 100 according to the first embodiment. In FIG. 2, the cabinet 10 and the speaker unit 20 are viewed from different angles.

As illustrated in FIG. 1 and FIG. 2, the cabinet 10 includes a cover portion 11 and a side wall 12. The cover portion 11 has a disk shape and covers a lower side of the speaker unit 20, for example. The cover portion 11 includes sound holes 13. The sound holes 13 are arranged in a central portion 11*a* of the cover portion 11 in a radial direction. The sound holes 13 penetrate through the cover portion 11 in a thickness direction. In a state in which the speaker 100 is arranged in the ceiling portion C (speaker installed state), the cover portion 11 is arranged such that the sound holes 13 face downward. In the speaker installed state, the cover portion 11 is inclined such that a peripheral portion 11*b* is lowered from an outer peripheral portion toward the central portion 11*a*.

The side wall 12 is arranged along an outer circumference of the cover portion 11. The side wall 12 is attached to the ceiling portion C.

The speaker unit 20 is housed in a portion surrounded by the cover portion 11 and the side wall 12 in the cabinet 10. The speaker unit 20 includes a vibration source 21, a vibration plate 22, and the gasket 23. The vibration source 21 includes, for example, a permanent magnet and a voice coil. The vibration plate 22 is connected to the voice coil and vibrates in an integrated manner with the voice coil. The vibration plate 22 is arranged so as to face the cover portion 11.

The gasket 23 is arranged in a circular manner along an outer edge portion of the vibration plate 22 so as to surround the vibration plate 22. The gasket 23 protrudes from the outer edge portion of the vibration plate 22 toward the cover portion 11. The gasket 23 is formed by using, for example, a resin material, such as rubber.

In the present embodiment, the gasket 23 serves as a sealing portion that seals a gap between the cover portion 11 of the cabinet 10 and the speaker unit 20. The speaker unit 20 is arranged such that a lower end portion 23*a* of the gasket 23 comes into contact with the central portion 11*a* of the cover portion 11 so as to surround the sound holes 13. Meanwhile, the lower end portion 23*a* of the gasket 23 may be arranged so as to come into contact with the sound holes 13 or the peripheral portion 11*b* of the cover portion 11. The gasket 23 separates an inner portion K1 that is enclosed by the gasket 23 and an outer portion K2 that is located outside the gasket 23. In the cabinet 10, an electrical component or the like for driving the vibration source 21 is arranged in an upper part of the outer portion K2, for example.

The gasket 23 includes the slit portions 30. The slit portions 30 are arranged from an inner peripheral portion 23*b* to an outer peripheral portion 23*c* of the gasket 23 such that an inner side and an outer side surrounded by the gasket 23, that is, the inner portion K1 and the outer portion K2, communicate with each other. The slit portions 30 are formed entirely in a height direction from the lower end portion 23*a* of the gasket 23. Meanwhile, the slit portions 30 may be formed such that, for example, a part of the lower end portion 23*a* that comes into contact with the cabinet 10 is cut in the height direction of the gasket 23.

The slit portions 30 are formed so as to cross a direction in which the gasket 23 extends. Further, the slit portions 30 are formed along a horizontal direction in the speaker installed state. Furthermore, the slit portions 30 are formed so as to be oriented laterally with respect to a penetration direction of the sound holes 13 in the speaker installed state.

The slit portions 30 are arranged at a plurality of positions in the gasket 23. For example, the slit portions 30 may be arranged at two positions separated by 180 degrees around a central axis AX of the speaker 100. Meanwhile, the number of the slit portions 30 is not limited to the example as described above, and the slit portions 30 may be arranged at three or more positions.

Figure 3:
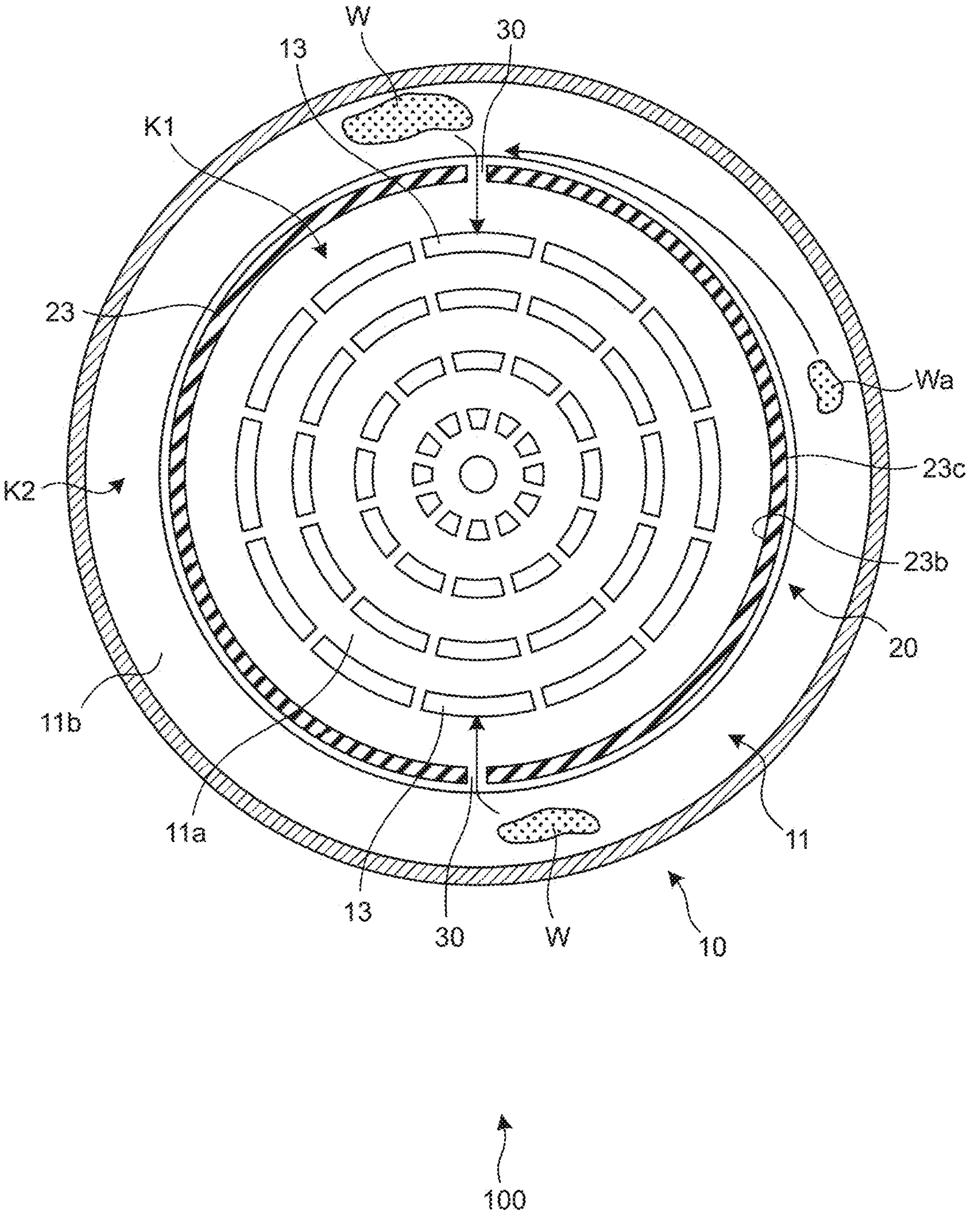
FIG. 3 is a diagram illustrating a configuration along an A-A cross-section in FIG. 1.

FIG. 3 is a diagram illustrating a configuration along an A-A cross-section in FIG. 1. FIG. 3 illustrates a cross-section that is cut along a plane parallel to a horizontal plane, at a height position at which the gasket 23 and the slit portions 30 are arranged.

As illustrated in FIG. 3, when water W gets in the outer portion K2 inside the cabinet 10, the water W flows from the peripheral portion 11*b* toward the central portion 11*a* due to the inclination of the peripheral portion 11*b*. When the water W reaches the gasket 23, the water W gets through the slit portions 30 that are formed in the gasket 23 and reaches the inner portion K1. The water W that has reached the inner portion K1 is discharged to the outside of the cabinet 10 via the sound holes 13.

Meanwhile, the peripheral portion 11*b* may be configured so as to be inclined downward toward portions in which the slit portions 30 are formed in a circumferential direction. In this case, as illustrated in FIG. 3, when water Wa gets in a portion in which the slit portions 30 are not arranged in the outer portion K2, the water Wa flows in the circumferential direction due to the inclination of the peripheral portion 11*b* and reaches any of the slit portions 30.

Further, for example, when the speaker 100 outputs voice, the vibration plate 22 vibrates. Water that has reached the inner portion K1 of the cabinet 10 is accelerated to be discharged from the sound holes 13 to the outside by pressure due to the vibration of the vibration plate 22.

As described above, the speaker 100 according to the present embodiment includes the cabinet 10 that includes the cover portion 11 in which the sound holes 13 are arranged, the speaker unit 20 that is housed in the cabinet 10, the gasket 23 serving as a sealing portion that is arranged so as to surround the sound holes 13 and seals a gap between the cover portion 11 and the speaker unit 20, and the slit portions 30 that are arranged from the inner peripheral portion 23*b* to the outer peripheral portion 23*c* of the gasket 23 such that an inner side and an outer side surrounded by the gasket 23 communicate with each other.

With this configuration, the slit portions 30 are arranged in the gasket 23 that seals the gap between the cover portion 11 and the speaker unit 20 inside the cabinet 10, so that it is possible to discharge water, which has got in the cabinet 10, from the slit portions 30 via the sound holes 13. In this manner, the slit portions 30 for discharging water can be arranged so as not to be viewed from outside, so that it is possible to prevent reduction of attractiveness of appearance. Further, even when water splashes from outside of the cabinet 10, it is possible to prevent the water from getting in the outer portion K2 or the like inside the cabinet 10.

In the speaker 100 according to the present embodiment, the sealing portion includes the gasket 23 that is arranged in the speaker unit 20, and the slit portions 30 are arranged in the gasket 23. With this configuration, it is possible to appropriately guide water that has got in the cabinet 10 to the sound holes 13.

In the speaker 100 according to the present embodiment, the cover portion 11 is inclined so as to be lowered from the outer peripheral portion toward the central portion 11*a* in which the sound holes 13 are arranged in the speaker installed state. With this configuration, it is possible to allow water that has got in the cabinet 10 to easily flow to the sound holes 13, so that it is possible to effectively discharge the water from the sound holes 13.

In the speaker 100 according to the present embodiment, the slit portions 30 are arranged at a plurality of positions in the gasket 23. With this configuration, it is possible to more reliably guide water that has got in the cabinet 10 to the sound holes 13.

Second Embodiment

Figure 4:
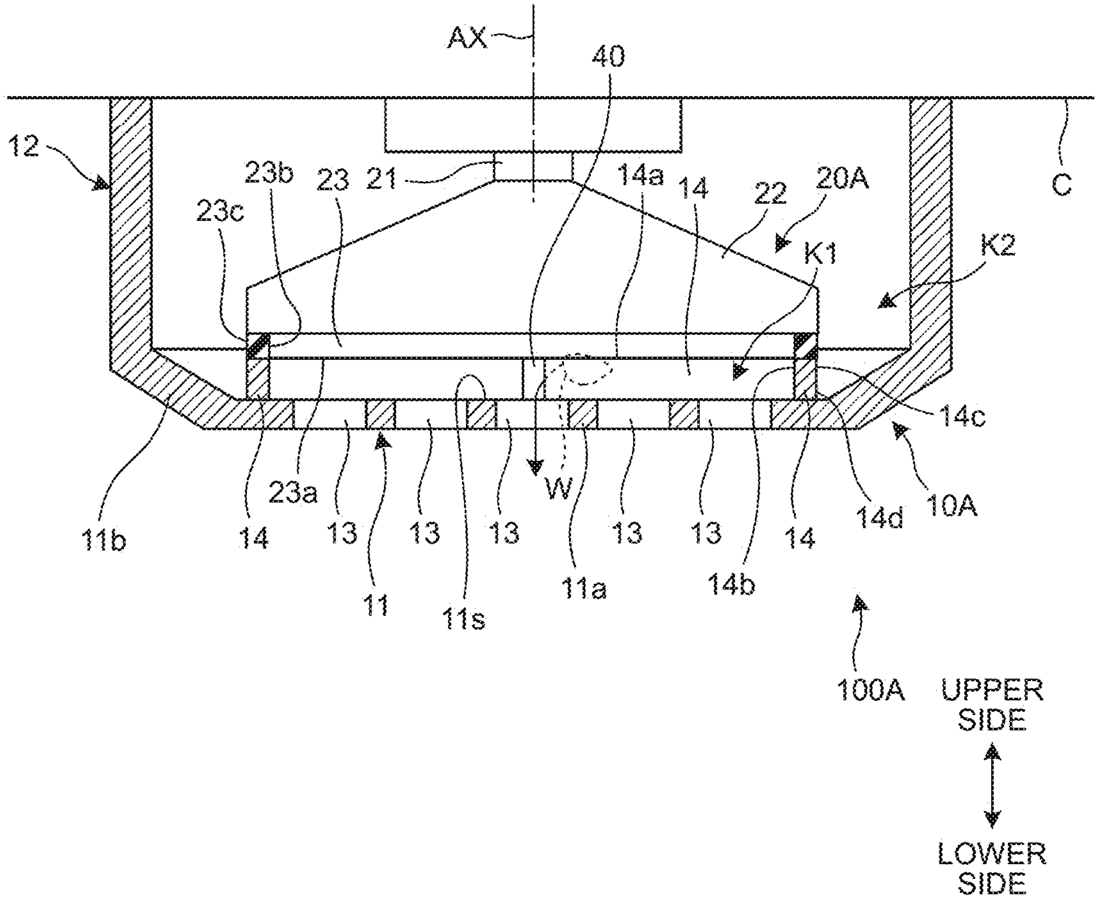
FIG. 4 is a diagram illustrating an example of a speaker according to a second embodiment.
Figure 5:
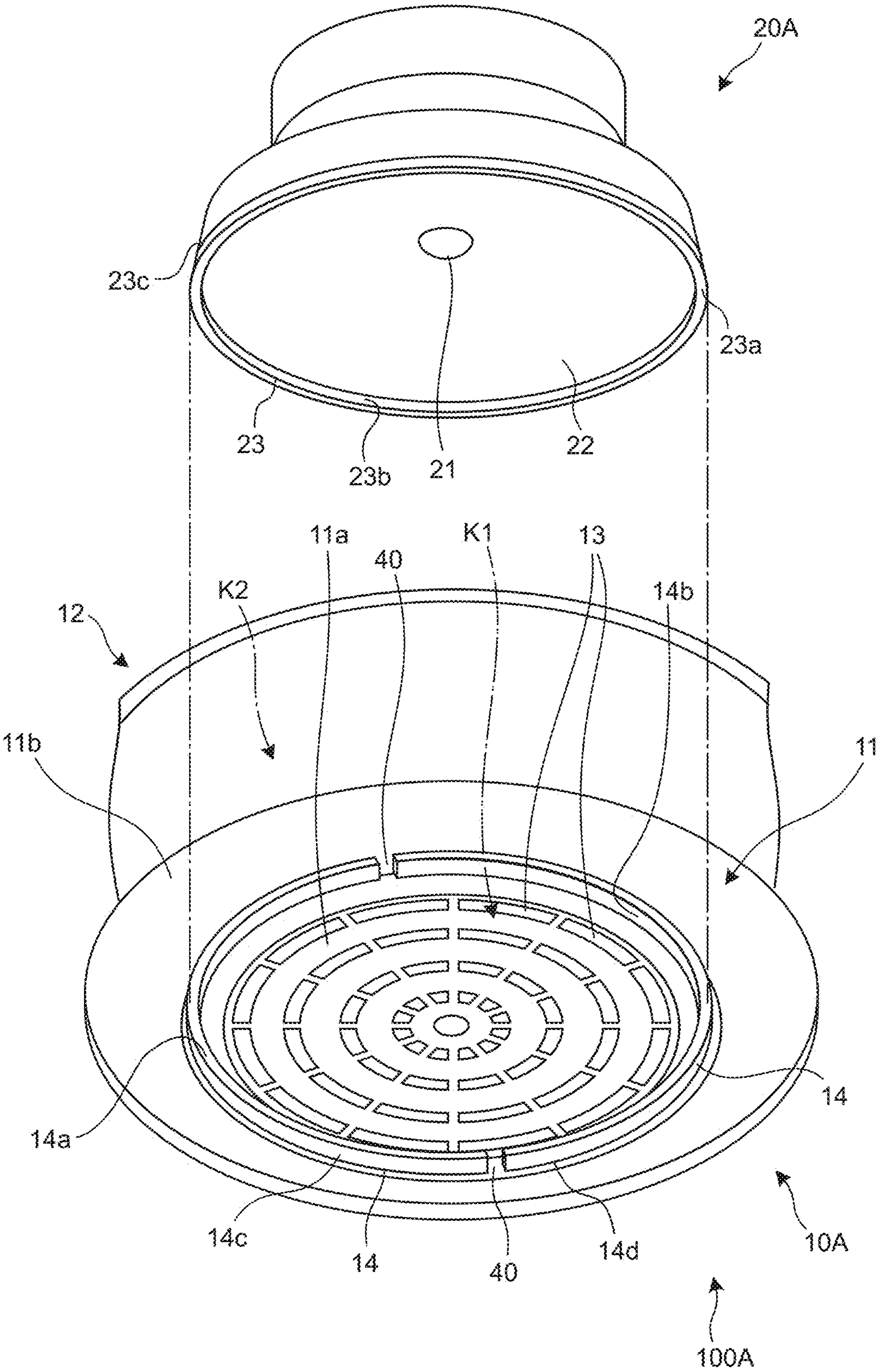
FIG. 5 is a perspective view illustrating an example of the speaker according to the second embodiment.

FIG. 4 is a diagram illustrating an example of a speaker 100A according to a second embodiment. FIG. 4 illustrates a cross section of a part of components (a cabinet 10A, a rib 14, the gasket 23, and slit portions 40). FIG. 5 is a perspective view illustrating an example of the speaker 100A according to the second embodiment. In FIG. 5, the cabinet 10A and a speaker unit 20A are viewed from different angles. Further, in FIG. 5, a part of the side wall 12 is omitted to illustrate an inner part of the cabinet 10A.

As illustrated in FIG. 4 and FIG. 5, the speaker 100A includes the cabinet 10A and the speaker unit 20A. The cabinet 10A includes the cover portion 11, the side wall 12, and the rib 14. The cover portion 11 and the side wall 12 have the same configurations as those of the first embodiment. In the present embodiment, the cabinet 10A is different from the cabinet 10 of the embodiment as described above in that the cabinet 10A includes the rib 14. Further, the speaker unit 20A is different from that of the first embodiment in that the slit portions are not arranged in the gasket 23. Other configurations of the speaker unit 20A are the same as those of the first embodiment.

The rib 14 is arranged on an inner surface 11*s* of the cover portion 11. The rib 14 protrudes from the inner surface 11*s* toward the speaker unit 20A. The rib 14 is arranged so as to surround the sound holes 13. The rib 14 comes into contact with the lower end portion 23*a* of the gasket 23 of the speaker unit 20A. Due to the contact between the rib 14 and the lower end portion 23*a* of the gasket 23, a gap between the cover portion 11 and the speaker unit 20A is sealed. In this example, the rib 14 and the gasket 23 constitute a sealing portion. By arranging the rib 14, the speaker unit 20A is arranged so as to be separated from the inner surface 11*s* of the cover portion 11 by a height of the rib 14.

The rib 14 includes the slit portions 40. The slit portions 40 are arranged from an inner peripheral portion 14*b* to an outer peripheral portion 14*c* of the rib 14 such that an inner side and an outer side surrounded by the rib 14 communicate with each other. The slit portions 40 are arranged in a base portion 14*d*, for example. Meanwhile, the slit portions 40 may be formed entirely in a height direction from the base portion 14*d* to an upper end portion 14*a* of the rib 14.

The slit portions 40 are formed so as to cross a direction in which the rib 14 extends. Further, the slit portions 40 are formed along a horizontal direction in the speaker installed state. Furthermore, the slit portions 40 are formed so as to be oriented in a lateral direction with respect to a penetration direction of the sound holes 13 in the speaker installed state.

The slit portions 40 are arranged at a plurality of positions in the rib 14. For example, the slit portions 40 may be arranged at two positions separated by 180 degrees around a central axis AX of the speaker 100A. Meanwhile, the number of the slit portions 40 is not limited to the example as described above, and the slit portions 40 may be arranged at three or more positions.

When the water W gets in the outer portion K2 inside the cabinet 10A (see FIG. 4), the water W flows from the peripheral portion 11*b* toward the central portion 11*a* due to the inclination of the peripheral portion 11*b*. When the water reaches the rib 14, the water gets through the slit portions 40 that are formed in the rib 14 and reaches the inner portion K1. The water W that has reached the inner portion K1 is discharged to the outside of the cabinet 10A via the sound holes 13. Furthermore, for example, when the speaker 100A outputs voice, the vibration plate 22 vibrates. The water W that has reached the inner portion K1 of the cabinet 10A is accelerated to be discharged from the sound holes 13 to the outside by pressure due to the vibration of the vibration plate 22.

As described above, the speaker 100A according to the present embodiment includes the cabinet 10A that includes the cover portion 11 in which the sound holes 13 are arranged, the speaker unit 20A that is housed in the cabinet 10A, the rib 14 serving as a sealing portion that is arranged so as to surround the sound holes 13 and that seals a gap between the cover portion 11 and the speaker unit 20A, and the slit portions 40 that are arranged from the inner peripheral portion 14*b* to the outer peripheral portion 14*c* of the rib 14 such that an inner side and an outer side surrounded by the rib 14 communicate with each other.

With this configuration, the slit portions 40 are arranged in the rib 14 that seals the gap between the cover portion 11 and the speaker unit 20A inside the cabinet 10A, so that it is possible to discharge water, which has got in the cabinet 10A, from the slit portions 40 via the sound holes 13. In this manner, the slit portions 40 for discharging water can be arranged so as not to be viewed from outside, so that it is possible to prevent reduction of attractiveness of appearance. Further, even when water splashes from outside of the cabinet 10A, it is possible to prevent the water from getting in the outer portion K2 or the like inside the cabinet 10A.

Furthermore, in the speaker 100A according to the present embodiment, the sealing portion includes the rib 14 that is arranged in the cabinet 10A, and the slit portions 40 are arranged in the rib. With this configuration, it is possible to appropriately guide water that has got in the cabinet 10A to the sound holes 13.

The technical scope of the present disclosure is not limited to the embodiments as described above, and appropriate modifications may be made without departing from the gist of the present disclosure. For example, while the configuration in which the slit portions 40 are arranged in the rib 14 that serves as the sealing portion has been described as an example in the second embodiment as described above, embodiments are not limited to this example.

Figure 6:
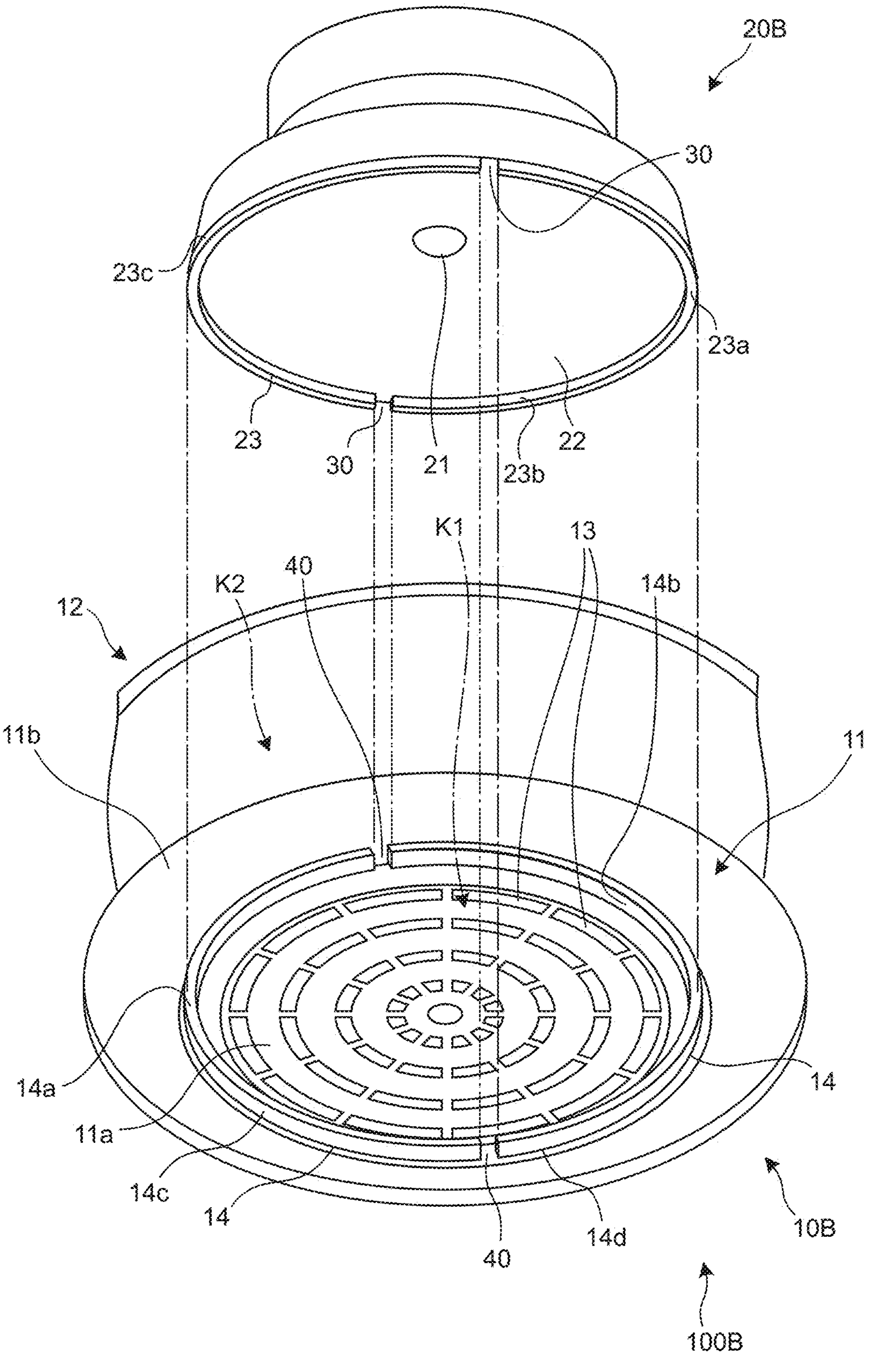
FIG. 6 is an exploded perspective view illustrating a speaker of another example.

FIG. 6 is an exploded perspective view of a speaker according to another example. A speaker 100B illustrated in FIG. 6 includes a cabinet 10B and a speaker unit 20B. The cabinet 10B has the same configuration as the cabinet 10A described in the second embodiment. The speaker unit 20B has the same configuration as the speaker unit 20 described in the first embodiment. Specifically, the speaker 100B includes the slit portions 40 in the rib 14 of the cabinet 10B, and the slit portions 30 in the gasket 23 of the speaker unit 20B.

As illustrated in FIG. 6, the slit portions 40 and the slit portions 30 are arranged at corresponding positions in a circumferential direction, for example. In this manner, it may be possible to arrange the slit portions in both of the rib 14 and the gasket 23 that constitute the sealing portion. In this case, the positions of the slit portions 40 and the positions of the slit portions 30 in the circumferential direction need not always correspond to each other. Meanwhile, the slit portions may be arranged in the gasket 23 without being arranged in the rib 14.

According to the present disclosure, it is possible to provide a speaker that is able to prevent reduction of attractiveness of appearance.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A speaker comprising:

a cabinet that includes a cover portion in which a sound hole is arranged;

a speaker unit that is housed in the cabinet;

a sealing portion that is arranged so as to surround the sound hole and seals a gap between the cover portion and the speaker unit; and a slit portion that is arranged from an inner peripheral portion to an outer peripheral portion of the sealing portion such that an inner side and an outer side surrounded by the sealing portion communicate with each other.

2. The speaker according to claim 1, wherein the sealing portion includes a gasket that is arranged in the speaker unit, and the slit portion is arranged in the gasket.

3. The speaker according to claim 1, wherein the sealing portion includes a rib that is arranged in the cabinet, and the slit portion is arranged in the rib.

4. The speaker according to any one of claim 1, wherein the cover portion is inclined so as to be lowered from an outer peripheral portion toward a portion in which the sound hole is arranged in a speaker installed state.

5. The speaker according to any one of claim 1, wherein the slit portion is arranged at a plurality of positions in the sealing portion.

* * * * *